US012489529B2

(12) United States Patent
Zeinolabedinzadeh

(10) Patent No.: US 12,489,529 B2
(45) Date of Patent: Dec. 2, 2025

(54) TWO-DIMENSIONAL SCALABLE HIGH-POWER OPTICAL PHASED ARRAY ARCHITECTURE WITH BEAM STEERING

(71) Applicant: ARIZONA BOARD OF REGENTS ON BEHALF OF ARIZONA STATE UNIVERSITY, Scottsdale, AZ (US)

(72) Inventor: Saeed Zeinolabedinzadeh, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 67 days.

(21) Appl. No.: 18/750,040

(22) Filed: Jun. 21, 2024

(65) Prior Publication Data
US 2024/0340089 A1    Oct. 10, 2024

Related U.S. Application Data

(63) Continuation of application No. 18/059,223, filed on Nov. 28, 2022, now Pat. No. 12,040,839.

(60) Provisional application No. 63/283,739, filed on Nov. 29, 2021.

(51) Int. Cl.
*H04B 10/00* (2013.01)
*H04B 10/50* (2013.01)
*H04B 10/564* (2013.01)
*H04J 14/00* (2006.01)

(52) U.S. Cl.
CPC ....... *H04B 10/564* (2013.01); *H04B 10/5057* (2013.01)

(58) Field of Classification Search
CPC .. G02B 27/0087; H01Q 3/2676; G02F 1/292; G02F 1/2955
See application file for complete search history.

(56) References Cited

U.S. PATENT DOCUMENTS

| 10,320,087 B2 | 6/2019 | Miraftab et al. |
| 2014/0192394 A1 | 7/2014 | Sun et al. |
| 2016/0245895 A1 | 8/2016 | Lane et al. |
| 2020/0091603 A1* | 3/2020 | Shi ....................... H01Q 21/062 |
| 2020/0150240 A1* | 5/2020 | Huwer ................. G01S 7/4865 |

OTHER PUBLICATIONS

Aldaya et al., A Tutorial on Optical Feeding of Millimeter-Wave Phased Array Antennas for Communication Applications, International Journal of Antennas and Propagation, vol. 2015, Article ID 264812, 22 pages.

(Continued)

*Primary Examiner* — Daniel G Dobson
(74) *Attorney, Agent, or Firm* — MH2 Technology Law Group, LLP

(57) ABSTRACT

A communications device including an array of optical transmitters, each element of the array including an optical source and an antenna coupled to the optical source. The communications device also includes a plurality of tunable delay components interconnecting transmitters in the array of optical transmitters, and a communications signal path configured to conduct a communications signal through the array of the optical transmitters. The optical sources are synchronized.

20 Claims, 4 Drawing Sheets

(56) References Cited

OTHER PUBLICATIONS

Cala et al., On the performance of optical phased array technology for beam steering: effect of pixel limitations, Optics Express, vol. 28, No. 21, Oct. 12, 2020, 21 pages.
Han et al., Multi-dimensional and large-sized optical phased array for space laser communication, Optics Express, vol. 30, No. 4, Feb. 14, 2022, 12 pages.
Hwang, Novel non-plasmonic nanolasers empowered by topology and interference effects, Nanophotonics 2021; vol. 10, Issue 14, pp. 3599-3611, Oct. 2021.
Ma et al., Plasmonic nanolasers: fundamental properties and applications, Nanophotonics 2021; vol. 10, Issue 14, pp. 3623-3633, Oct. 2021.
Wang et al., 2D broadband beamsteering with large-scale MEMS optical phased array, Optica, vol. 6, No. 5, May 2019, pp. 557-562.
Sun et al., Large-scale nanophotonic phased array, 2013, Nature, vol. 493, No. 7431, pp. 195-199.
Doylend et al., Two-dimensional free-space beam steering with an optical phased array on silicon-on-insulator, Opt. Express 19, 2011, pp. 21595-21604.
Van Acoleyen et al., Two-dimensional optical phased array antenna on silicon-on-insulator, Opt. Express 18, 2010, pp. 13655-13660.

\* cited by examiner

TWO-DIMENSIONAL SCALABLE HIGH-POWER OPTICAL PHASED ARRAY ARCHITECTURE WITH BEAM STEERING

CROSS REFERENCE TO RELATED APPLICATIONS

This application is a continuation of U.S. patent application Ser. No. 18/059,223, now allowed, which was filed on Nov. 28, 2022, and claims the benefit of and priority to U.S. Provisional Patent Application 63/283,739, which was filed on Nov. 29, 2021, and are incorporated herein by reference in their entireties.

FIELD

The present disclosure relates to communications and ranging systems, and more particularly to optical communications systems and ranging.

BACKGROUND

Optical communication provides the fastest way of data transmission and optical ranging provides the best resolution. In addition, the beam width of optical signals can be very narrow compared to radio frequency or millimeter-wave signals. Optical phased arrays enable electronic steering of optical beams. One dimensional phased arrays are formed by integrating delay components such as, for example, but not limited to, phase shifters such as, but not limited to, ring resonator-based phase shifters, and delay elements, in linear arrays of nano antennas. Two dimensional arrays similarly can be achieved by using, for example, tunable phase shifters and optical antennas in 2D fashion. An exemplary conventional phased array system is shown in FIGS. 1 and 2. The exemplary conventional phased array includes a single source 101 (FIG. 1)/201 (FIG. 2), for example, but not limited to, laser source, an input power distribution optical waveguide 102 (FIG. 1), and an optical coupler 104 (FIG. 1) for each group of antennas 103 (FIG. 1)/205 (FIG. 2) and waveguides 106 (FIG. 1)/204 (FIG. 2). This conventional phased array architecture experiences power loss within optical signal distribution and tunable delay components (e.g. phase shifters or tunable delay lines) 203 (FIG. 2). In the conventional architecture, the array size cannot be increased beyond a certain point, and increasing the array size does not reduce the transmitted power. To accommodate a large phased array system with high output power, several optical amplifier stages may be required as shown in the exemplary architecture in FIG. 2. These optical amplifiers 202 (FIG. 2) are challenging to manufacture with high yield and can consume a large amount of direct current (DC) power. In addition, such systems suffer from the phase shifter loss and the loss of the power distribution network in operation. Further, the light distribution waveguides 204 (FIG. 2) pose a limitation on the amount of the distributed light power due to power handling limitations of these types of waveguides. The system line width, that is, the phase noise, is determined mostly by the input laser source 101 (FIG. 1)/201 (FIG. 2), assuming negligible degradation of phase noise caused by the optical amplifiers 202 (FIG. 2). Finally, the complexity of the electronic control units can be hindersome for large optical phased array systems.

What is needed is an optical phased array system having a scalable scheme without a limitation on power transmission capability. The significant power loss due to delay components is not acceptable for some applications and results in considerable degradation of power efficiency which can significantly affect the performance of portable applications. What is needed is a scheme that eliminates the delay component loss and enhances power efficiency. What is further needed is an architecture that has no scalability concerns, and, at the same time, cases the electrical routing and control of the delay components.

SUMMARY

The present disclosure is related to integrated optical transmitter with beam steering capability wherein an array of antenna elements together with laser sources can transmit high-power optical signals. The optical transmitters can also beamform and steer the signal toward the desired direction by electronic control. The latter property is a result of optical phased array technology. The architecture according to the present disclosure is distinguished from other phased array systems in that, first, the architecture is a scalable two-dimensional architecture that can transmit high-power signals without any concern for the power-handing capabilities of the optical waveguides. In addition to scaling of aperture size, transmitted power can also be scaled with the size of the array. Second, the architecture eliminates delay component-induced power loss. Without this power loss, system efficiency is improved and transmitted power is increased. Third, the architecture reduces the line width (i.e., phase noise) of the locally generated laser signals as an automatic consequence of the coherent coupling of the sources. Fourth, the architecture drastically simplifies the phase control scheme and interconnections within the system and reduces the required electronic routing and DC power for the control circuitry of the individual pixels, rows and columns.

A two-dimensional truly scalable high-power optical phased array architecture with electronic beam steering capability is provided. There is no limitation on the size of the proposed scalable array in contrast to the existing solutions. The power distribution network does not limit the size of the array and the loss of the delay component does not affect the transmitted power. Thus, power efficiency is not reduced. The proposed architecture also relaxes the electronic control of the delay components for beam steering and improves the overall line width of the laser signal. The system of the present disclosure provides a solution for low size, weight, and power consumption (SWaP) massive integrated optical array systems with high transmission power, Further, the system of the present disclosure prevents the effect of delay component loss in the transmitted power, since no optical power flows through the delay components once the new beam steering state is established. The new scheme allows the use of multiple laser sources working coherently creating higher power signal generation with improved line width.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a communications device including an array of optical transmitters, each element of the array including an optical source and an antenna coupled to the optical source. The communications device also includes a plurality of tunable delay components interconnecting transmitters in the array of optical transmitters, and a communications signal path configured to conduct a communications signal through the array of the optical transmitters, where the optical sources are synchronized. Other embodiments of this aspect include corresponding computer systems, apparatus, and computer programs recorded on one or more computer storage devices, each configured to perform the actions of the methods.

Implementations may include one or more of the following features. The communications device as may include a tuning signal path configured to conduct a tuning signal to the plurality of tunable delay components. The communications signal is conducted through the array of the optical transmitters after a tuning signal has tuned the plurality of tunable delay components. The tuning signal may include an optical signal or an electronic signal. The plurality of tunable delay components may include a plurality of tunable phase shifters. The optical source drives a plurality of the antennas and may include a laser. The plurality of tunable delay components may include a means for beam steering and/or at least one delay component row, and/or at least one delay component column. The communications device may include at least one controller configured to tune the at least one delay component row and/or column with a single command. The communications device may include at least one controller configured to synchronize the optical sources. The optical sources are phase locked to each other, possibly by optical coupling. Implementations of the described techniques may include hardware, a method or process, or computer software on a computer-accessible medium.

One general aspect includes a communications device including an array of optical transmitters. The array may include subsets, and the subsets may include an optical source and a plurality of antennas and a first plurality of tunable delay components coupled to the optical source. The communications device includes a second plurality of tunable delay components interconnecting array elements of the array of the optical transmitters, and a communications signal path configured to conduct a communications signal through the array of the optical transmitters after a tuning signal has tuned the first plurality of tunable delay components. Other embodiments of this aspect include corresponding computer systems, apparatus, and computer programs recorded on one or more computer storage devices, each configured to perform the actions of the methods.

Implementations may include one or more of the following features. The communications device may include a tuning signal path configured to conduct the tuning signal to the first plurality of tunable delay components. The optical source may include at least one of a laser, a vertical cavity surface emitting laser, an array of cavities pumped by the laser, a nanolaser, or a coupled laser source. Implementations of the described techniques may include hardware, a method or process, or computer software on a computer-accessible medium.

One general aspect includes an optical communications system. The optical communications system includes a plurality of optical sources coupled with plurality of antennas forming an array of optical transmitters. The array of optical transmitters forms a phased array, and the phased array produces a beam. The optical communication system also includes a plurality of delay components. Ones of the plurality of delay components are coupled to an optical coupling network between the plurality of optical sources, and a controller is configured to dynamically control a delay between transmitters of the array of optical transmitters. The controller is configured to perform beam steering, to tune a phase difference of the coupled sources, and to inhibit optical power flow through the plurality of delay components at steady state. Other embodiments of this aspect include corresponding computer systems, apparatus, and computer programs recorded on one or more computer storage devices, each configured to perform the actions of the methods.

Implementations may include one or more of the following features. The controller is configured to tune the plurality of delay components before the optical communications system commences hosting communications signals, and/or the controller is configured to inhibit tuning of the plurality of delay components when the optical communications system hosts the communications signals. Implementations of the described techniques may include hardware, a method or process, or computer software on a computer-accessible medium.

Those skilled in the art will appreciate the scope of the present disclosure and realize additional aspects thereof after reading the following detailed description of exemplary embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
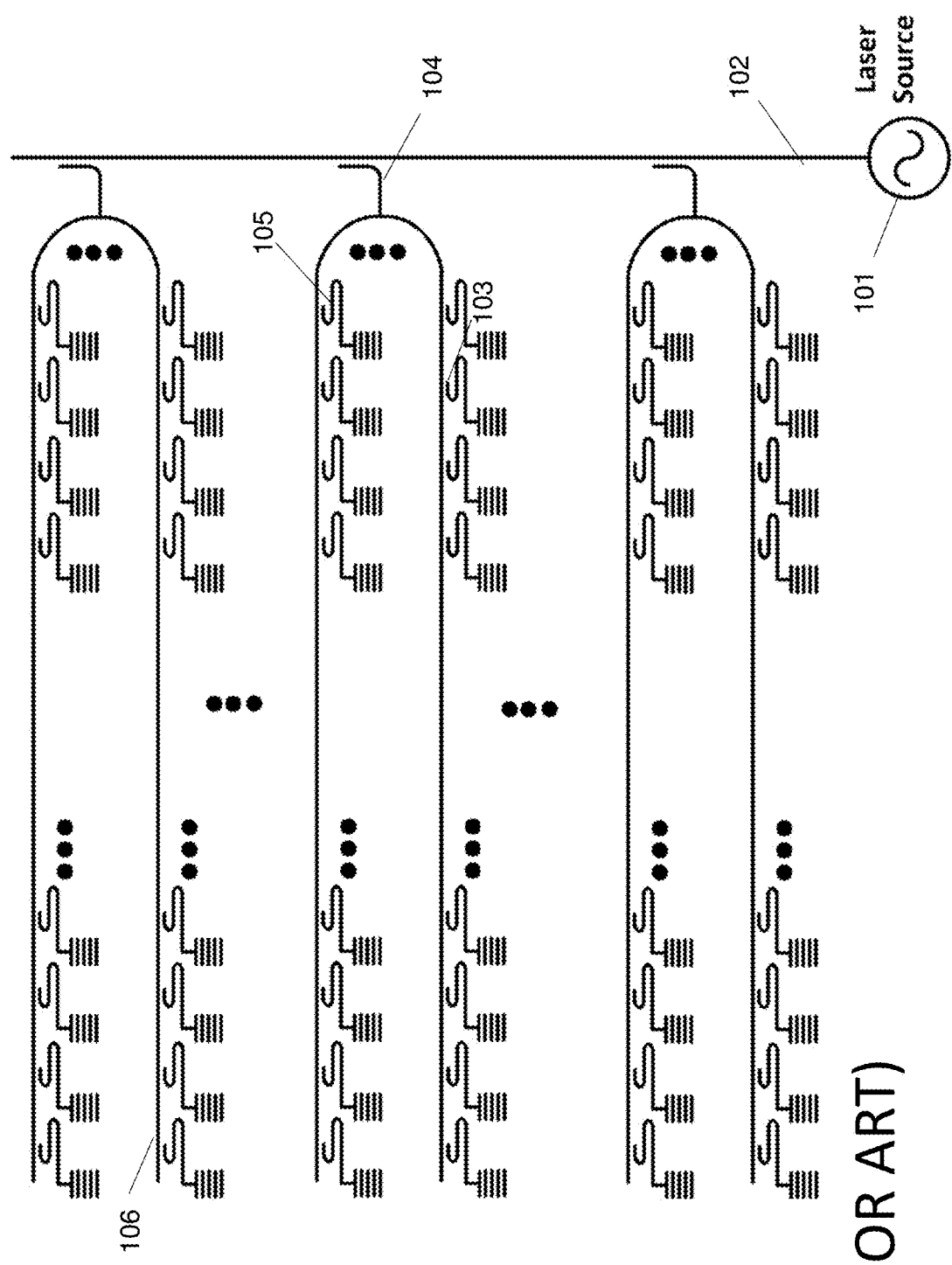
FIG. 1 (PRIOR ART) is an electronic connections diagram showing a transmitter architecture consisting of a conventional large array of tunable delay components such as phase shifters and delay lines, and optical antennas to provide the beam forming and beam steering capability.
Figure 2:
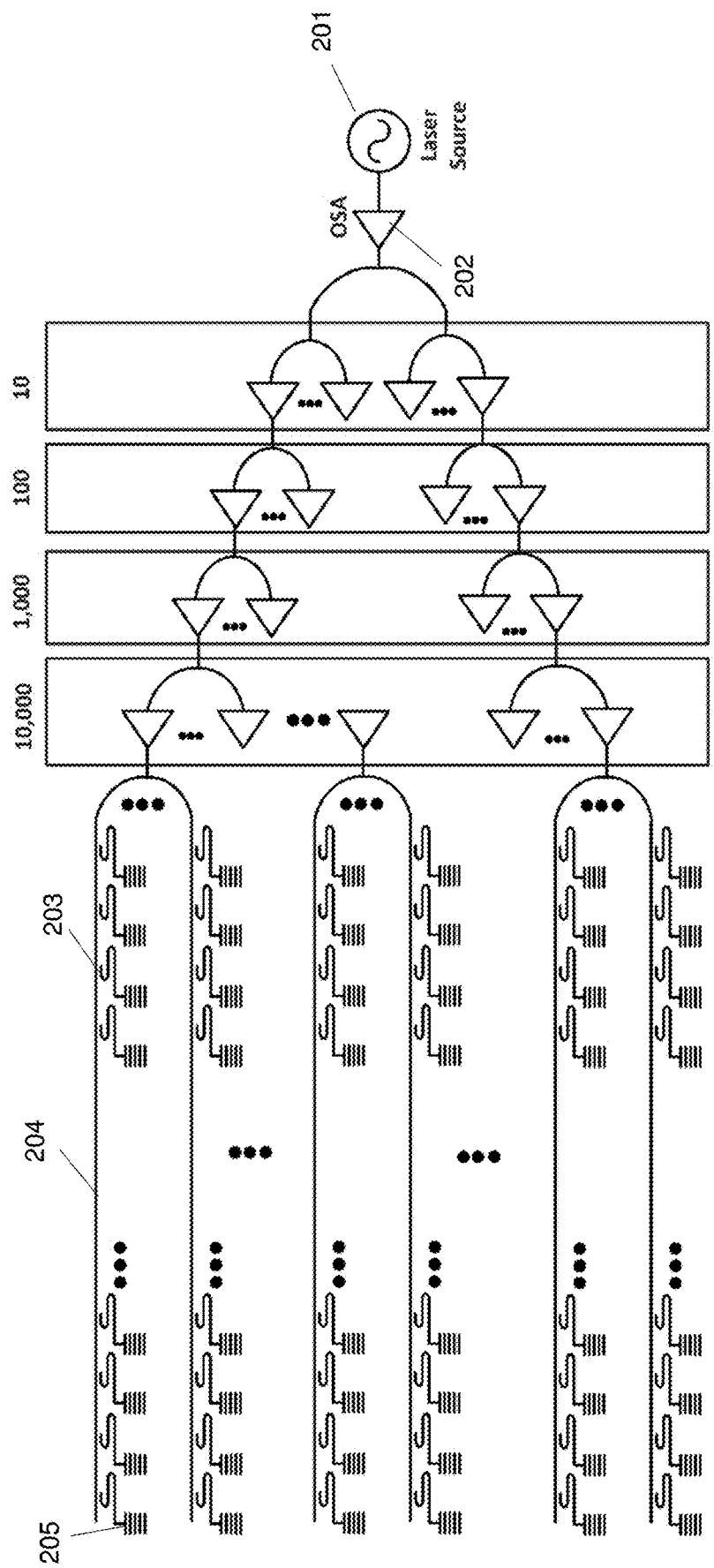
FIG. 2 (PRIOR ART) is an electronic connections diagram showing a transmitter architecture consisting of a large array of optical amplifiers, the arrays of optical antennas together with tunable delay components such as phase shifters and delay lines providing the beam forming and beam steering capability.

The embodiments set forth below represent the necessary information to enable those skilled in the art to practice the embodiments and illustrate modes of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The architecture according to the present disclosure allows the realization of scalable two-dimensional optical phased array systems wherein the transmit power can also be scaled by scaling the array size without the limitations imposed by the power division network or power handling capability of the optical waveguides. The losses imposed by the signal distribution network of previous systems prevent radiated power enhancement for larger arrays beyond certain array size for standard array architectures. This limitation is overcome in the present architecture for true scalability of the array and transmitted power proportionally without any limitation. The architecture according to the present disclosure also eliminates the loss due to the delay components in the signal path, thus improving output power and efficiency.

In addition, the complexity of the electronic control of the phase shifters is significantly reduced. Furthermore, the coupled network of sources improves the line width of the signal.

Figure 3:
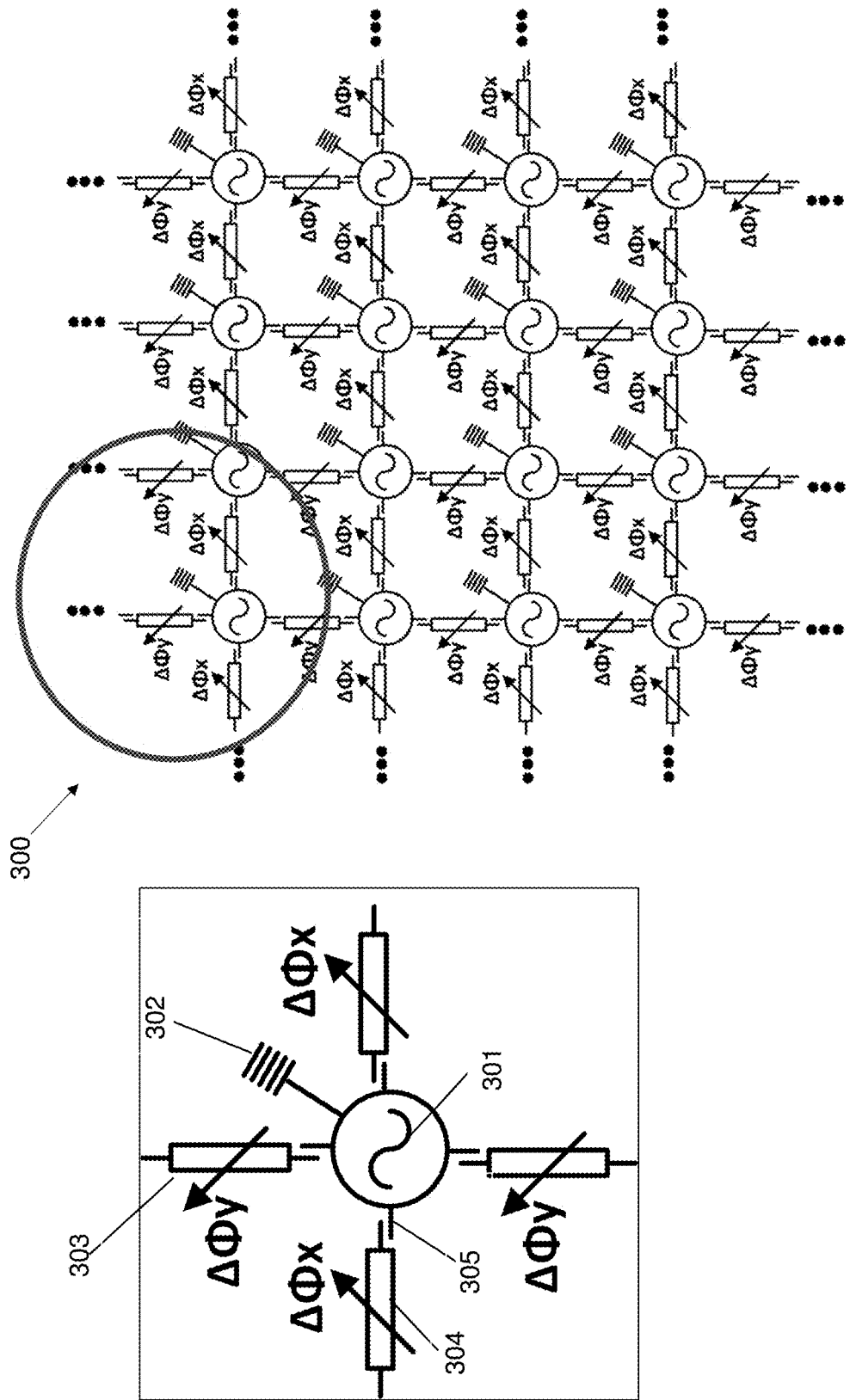
FIG. 3 is an electronic connections diagram showing a massive optical phased array system with stand-alone laser, nanolaser, or cavity pumped laser for each individual optical antenna, according to the present disclosure.

Referring now to FIG. 3, an exemplary system utilizes light sources 301, for example, but not limited to, laser sources, coupled with each other through two-dimensional optically coupled networks in which the phase shifters are located between the laser sources 301 and coupled to the optical coupling waveguides 305 between the column phase shifter 303 and the row phase shifter 304 in the phased array system 300. The optical coupling or any other synchronization scheme including electrical synchronization can be utilized for coherent operation of the light sources. The light sources 301 can include any source, for example, but not limited to, laser pumped cavities, VCSEL, metal shell and metal core nanolasers, and nanoLEDs. The nanolasers can include, for example, but not limited to plasmonic or non-plasmonic nanolasers. The exemplary massive optical phased array 300 shown in FIG. 3 includes, for the pixels, source 301 for individual optical antennas 302, which can include nanoantennas. The sources 301 are synchronized, and phase locked by either optical coupling or other phase locking methods. The tunable delay components (e.g. lossy phase shifters ($\Delta\Phi$)) 303 and 304 placed inside coupling network 300 facilitate phase adjustment of the pixel without introducing loss to the main signal path where transmission occurs. After the neighbor sources are synchronized, there is no power flow between those sources. The delay components between the sources generate the required delay (e.g. phase shift), but since there is no power flow between the sources in a steady state situation, the delay components do not introduce any loss to the signal. In other words, the source is radiating its power through the antenna 302 with no power transfer to its neighbor source at steady state. The delay line or phase shifter can be used without the loss of generality. The effect of optical phase shifter loss 105 on the transmit power can effectively be eliminated in the architecture according to the present disclosure by utilizing delay components 303 and 304 as the phase shifting elements between sources 301. The phase of source 301 can be tuned by tuning the phase of the delay components 303 and 304 between the coupled sources at the steady state once the synchronization is established. In contrast to the conventionally used phased array with separate phase shifter 105 (FIG. 1) at the antenna port in the signal path, the present architecture avoids passing the transmitted signal through the lossy delay component and eliminates power loss. Since there is no signal flow between the sources 301 after synchronization, the delay component loss in the topology according to the present disclosure does not affect the transmitted power. In other words, each local source 301 transmits the signal directly to an antenna 302 without propagating the signal through a, for example, lossy phase shifter. Since the phase of the source 301 in the pixel within the rows or the columns is automatically progressed by including the delay components 303 and 304 in the coupling network 300, the phase of the columns or the rows can be tuned with just a single control signal. In other words, a control voltage or digital signal can set the control of all delay components in a row or in a column in this 2D architecture. For the correct operation of the beam steering phased array, a progressive phase shift (or delay) across the row with a fixed phase shift (or delay) between the successive sources for a specific beam angle is needed. Thus, the electronic control, which can be a limiting factor in realizing larger two-dimensional arrays, and electrical routing, is greatly simplified, with reduction in the required real estate for the control of the delay components 303 and 304. In other words, instead of routing individual control lines for the delay component to control each individual element, a single phase shift amount (delay) is adjusted between the sources and that requires one control signal that controls all the delay components in a row or in a column all together. More importantly, the number of required control circuits such as digital-to-analog converters is significantly reduced, thus power savings can be obtained. In some configurations, free running sources 301 with a robust and solid synchronization mechanism can avoid multi-modal excitation and chaotic behavior. Compared to photonic crystal based VCSEL coupled lasers, which has demonstrated steering by electrical injection, the present technique does not need a separate electrical control for each element, it does not change the wavelength of the emitted light during beam steering, it does not cause mode switching, and the steering angle can be wider without losing the coherence.

Figure 4:
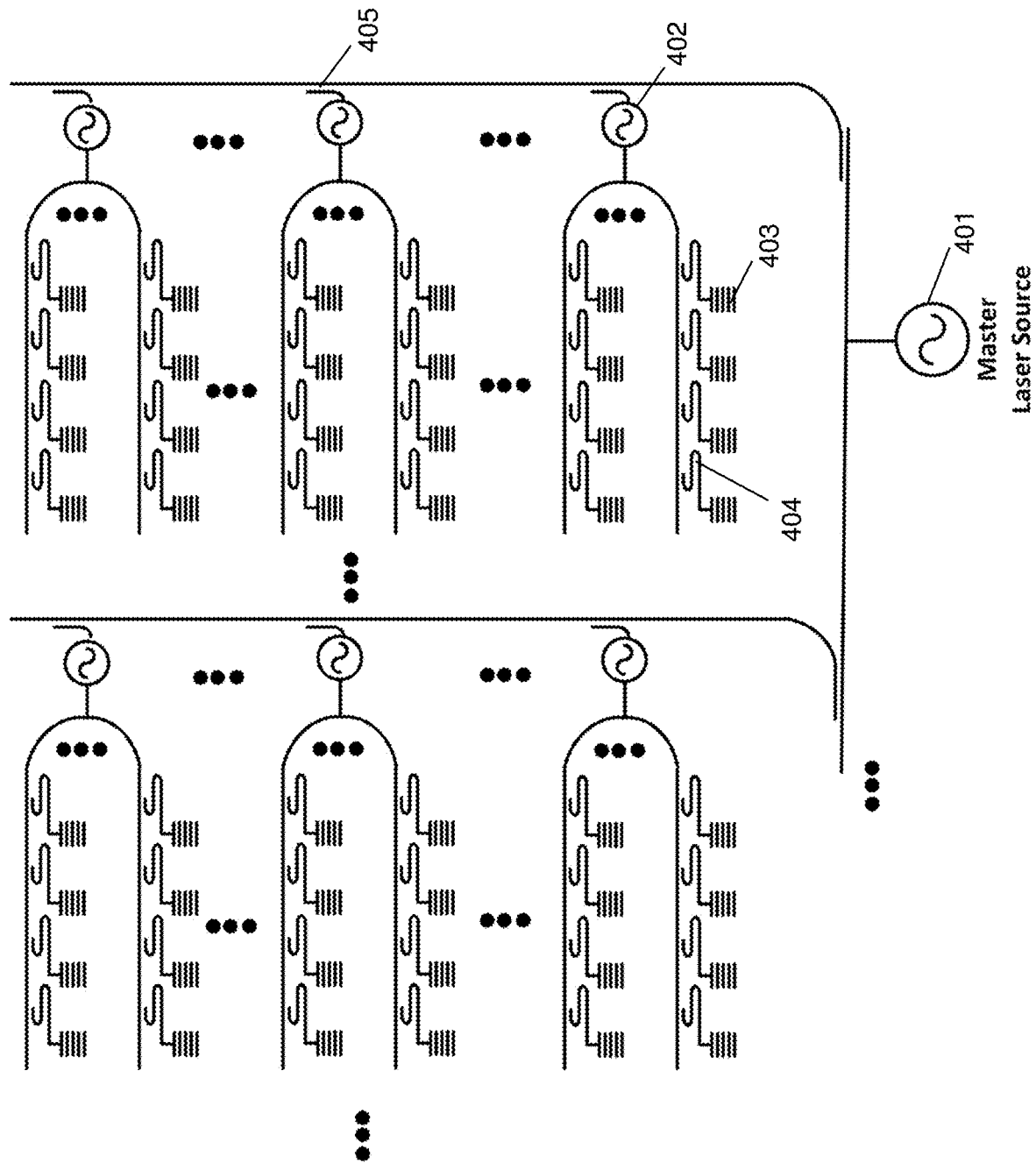
FIG. 4 is an electronic connections diagram showing the use of the system in FIG. 3 when a subset of antennas and phase shifters is supplied by a separate laser instead of each antenna being driven by a standalone laser.

Referring now to FIG. 4, in an exemplary alternate configuration, a subset of phased array antennas is driven with a laser source 402 instead of driving each antenna 403 with a separate source. This architecture eliminates a portion of the power distribution loss of the system as in FIG. 1. The laser sources 402 are coupled to each other and synchronized to a master laser source 401. The coupling between the sources 402 improves the linewidth of the output light. In this configuration, several sources 402 can provide enough signal power to various branches of the phased array system with no need for signal amplification. The sources 402 are synchronized to ensure that power transmitted from various sources combines constructively, and each of sources 402 includes an optical coupler 405 to a wave guide. The system shown in FIG. 4 includes separate control of various phase shifters 404, and associated power consumption and signaling interconnection and design. In an aspect, the phase shift is controlled by changing the temperature of phase shifter 404 by the application of controlled current to a resistor-based heater or by applying an electrical voltage on a doped waveguide to establish charge injection. The architecture is not limited by the type of the delay components or the control mechanism.

Those skilled in the art will recognize improvements and modifications to exemplary embodiments of the present disclosure. All such improvements and modifications are considered within the scope of the concepts disclosed herein and the claims that follow.

What is claimed is:

1. A communications device, comprising:
   an array of optical transmitters, each element of the array including:
      an optical source; and
      an antenna coupled to the optical source;
   a plurality of tunable delay components interconnecting transmitters in the array of optical transmitters; and
   a communications signal path configured to conduct a communications signal through the array of the optical transmitters,
   wherein the optical sources are synchronized.

2. The communications device as in claim 1 further comprising:
   a tuning signal path configured to conduct a tuning signal to the plurality of tunable delay components.

3. The communications device as in claim 2 wherein the communications signal is conducted through the array of the optical transmitters after a tuning signal has tuned the plurality of tunable delay components.

4. The communications device as in claim 3 wherein the tuning signal comprises:
   an optical signal.

5. The communications device as in claim 2 wherein the plurality of tunable delay components comprises:
   a plurality of tunable phase shifters.

6. The communications device as in claim 2 wherein the tuning signal comprises:
   an electronic signal.

7. The communications device as in claim 1 wherein the optical source drives a plurality of the antennas.

8. The communications device as in claim 1 wherein the optical source comprises a laser.

9. The communications device as in claim 1 wherein the plurality of tunable delay components comprises:
   a means for beam steering.

10. The communications device as in claim 1 wherein the plurality of tunable delay components comprises:
    at least one delay component row; and
    at least one delay component column.

11. The communications device as in claim 10 further comprising:
    at least one controller configured to tune the at least one delay component row with a single command.

12. The communications device as in claim 10 further comprising:
    at least one controller configured to tune the at least one delay component column with a single command.

13. The communications device as in claim 1 comprising:
    at least one controller configured to synchronize the optical sources.

14. The communications device as in claim 1 wherein the optical sources are phase locked to each other.

15. The communications device as in claim 14 wherein the optical sources are phase locked to each other by optical coupling.

16. A communications device, comprising:
    an array of optical transmitters, the array including subsets, the subsets including:
       an optical source; and
       a plurality of antennas and a first plurality of tunable delay components coupled to the optical source;
    a second plurality of tunable delay components interconnecting array elements of the array of the optical transmitters; and
    a communications signal path configured to conduct a communications signal through the array of the optical transmitters after a tuning signal has tuned the first plurality of tunable delay components.

17. The communications device as in claim 16 further comprising:
    a tuning signal path configured to conduct the tuning signal to the first plurality of tunable delay components.

18. The communications device as in claim 16 wherein the optical source comprises:
    at least one of a laser, a vertical cavity surface emitting laser, an array of cavities pumped by the laser, a nanolaser, and a coupled laser source.

19. An optical communications system comprising:
    a plurality of optical sources coupled with plurality of antennas forming an array of optical transmitters, the array of optical transmitters forming a phased array, the phased array producing a beam;
    a plurality of delay components, each of the plurality of delay components coupled to an optical coupling network between the plurality of optical sources; and a controller configured to dynamically control a delay between transmitters of the array of optical transmitters, the controller configured to perform beam steering, the controller configured to tune a phase difference of the coupled sources, the controller configured to inhibit optical power flow through the plurality of delay components at steady state.

20. The optical communications system as in claim 19 wherein the controller is configured to tune the plurality of delay components before the optical communications system commences hosting communications signals, the controller configured to inhibit tuning of the plurality of delay components when the optical communications system hosts the communications signals.

* * * * *